US012153305B2

(12) United States Patent
Song et al.

(10) Patent No.: US 12,153,305 B2
(45) Date of Patent: Nov. 26, 2024

(54) BACKLIGHT MODULE AND MANUFACTURING METHOD THEREOF AND ELECTRONIC DEVICE

(71) Applicant: Lenovo (Beijing) Limited, Beijing (CN)

(72) Inventors: Xiaoxin Song, Beijing (CN); Dan Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 70 days.

(21) Appl. No.: 17/974,694

(22) Filed: Oct. 27, 2022

(65) Prior Publication Data

US 2023/0136660 A1    May 4, 2023

(30) Foreign Application Priority Data

Nov. 1, 2021    (CN) .......................... 202111284286.7

(51) Int. Cl.
*G02F 1/00*      (2006.01)
*G02F 1/1335*    (2006.01)
*G02F 1/13357*   (2006.01)

(52) U.S. Cl.
CPC .. *G02F 1/133603* (2013.01); *G02F 1/133605* (2013.01); *G02F 1/133606* (2013.01); *G02F 1/133612* (2021.01); *G02F 1/133621* (2013.01)

(58) Field of Classification Search
None
See application file for complete search history.

(56) References Cited

U.S. PATENT DOCUMENTS

| | | | |
|---|---|---|---|
| 2019/0227384 A1* | 7/2019 | Watanabe | G02F 1/133603 |
| 2023/0106169 A1* | 4/2023 | Peng | H01L 25/167 |
| | | | 257/91 |

FOREIGN PATENT DOCUMENTS

CN    111781771 A    10/2020

* cited by examiner

*Primary Examiner* — Gerald J Sufleta, II
(74) *Attorney, Agent, or Firm* — ANOVA LAW GROUP, PLLC

(57) ABSTRACT

A backlight module includes a first substrate, a control circuit, a plurality of light source points, a filling layer, and a reflection structure. The control circuit is arranged on a first side of the first substrate. The plurality of light source points are arranged on a side of the control circuit away from the first substrate, include at least one type of LED, and are controlled by the control circuit to emit light to a side of the LED away from the first substrate. The filling layer covers the plurality of light source points and a gap between neighboring light source points. The reflection structure is arranged on a side of the filling layer away from the plurality of light source points and configured to reflect the light emitted by the plurality of light source points.

20 Claims, 7 Drawing Sheets

BACKLIGHT MODULE AND MANUFACTURING METHOD THEREOF AND ELECTRONIC DEVICE

CROSS-REFERENCE TO RELATED APPLICATION

This application claims priority to Chinese Patent Application No. 202111284286.7, filed on Nov. 1, 2021, the entire content of which is incorporated herein by reference.

TECHNICAL FIELD

The present disclosure relates to the backlight technology field and, more particularly, to a backlight module, an electronic device of the backlight module, and a manufacturing method of the backlight module.

BACKGROUND

With the development of electronic technology, more and more electronic devices use a combination of Mini LED and a quantum dot layer as a backlight module to improve brightness of backlight of the electronic devices. However, currently, the backlight modules formed by combining the Mini LED and the quantum dot layer are relatively thick, which is not beneficial for developing a light and thin electronic device.

SUMMARY

Embodiments of the present disclosure provide a backlight module, including a first substrate, a control circuit, a plurality of light source points, a filling layer, and a reflection structure. The control circuit is arranged on a first side of the first substrate. The plurality of light source points are arranged on a side of the control circuit away from the first substrate, include at least one type of LED, and are controlled by the control circuit to emit light to a side of the LED away from the first substrate. The filling layer covers the plurality of light source points and a gap between neighboring light source points. The reflection structure is arranged on a side of the filling layer away from the plurality of light source points and configured to reflect the light emitted by the plurality of light source points to cause a second side of the first substrate to be a light-emitting side of the backlight module, the second side being opposite to the first side.

Embodiments of the present disclosure provide an electronic device, including a backlight module and a display module. The backlight module includes a first substrate, a control circuit, a plurality of light source points, a filling layer, and a reflection structure. The control circuit is arranged on a first side of the first substrate. The plurality of light source points are arranged on a side of the control circuit away from the first substrate, include at least one type of LED, and are controlled by the control circuit to emit light to a side of the LED away from the first substrate. The filling layer covers the plurality of light source points and a gap between neighboring light source points. The reflection structure is arranged on a side of the filling layer away from the plurality of light source points and configured to reflect the light emitted by the plurality of light source points to cause a second side of the first substrate to be a light-emitting side of the backlight module, the second side being opposite to the first side. The display module is arranged on the light-emitting side of the backlight module and displays based on the light emitted by the backlight module.

Embodiments of the present disclosure provide a manufacturing method for a backlight module. The method includes forming a control circuit on a first side of a first substrate, fixing a plurality of light source points on a side of the control circuit away from the first substrate, forming a filling layer on a side of the plurality of light source points away from the control circuit covering the plurality of light source points and a gap between neighboring light source points, and forming a reflection structure on a side of the filling layer away from the plurality of light source points including at least one type of LED. The plurality of light source points are controlled by the control circuit to emit light to a side of the plurality of light source points away from the first substrate. The reflection structure is configured to reflect the light emitted by the plurality of light source points to cause a second side of the first substrate to be a light-emitting side of the backlight module. The second side is opposite to the first side.

Compared with the existing technology, the above technical solution has the following advantages.

In the technical solutions of embodiments of the present disclosure, the plurality of light source points may be arranged on the side of the control circuit away from the first substrate and configured to emit light to the side of the light source points away from the first substrate. Then, the light may be reflected back to the first substrate by the reflection structure. The light may be transmitted out from the side of the first substrate away from the control circuit to increase the length of the light transmission path when the light emitted by the plurality of light source points passes through the first substrate. Thus, the light emitted by the plurality of light source points may be sufficiently mixed and transmitted out by the first substrate to improve the uniformity of the light emitted by the backlight module.

Moreover, in the technical solutions of embodiments of the present disclosure, the plurality of light source points may be configured to emit light to the side of the plurality of light source points away from the first substrate. After the light is transmitted to the reflection structure, the light may be reflected by the reflection structure back to the first substrate and then transmitted out from the first substrate. Thus, the distance between the plurality of light source points and the reflection structure and the thickness of the first substrate may be sufficiently utilized as the transmission path. Therefore, the thickness of the backlight module may be reduced, and the uniformity of the light emitted by the backlight module may be improved, which is beneficial to develop a light and thin backlight module.

DETAILED DESCRIPTION OF THE EMBODIMENTS

The technical solutions in embodiments of the present disclosure will be described in detail below with reference to the drawings in the embodiments of the present disclosure. Apparently, the described embodiments are only some embodiments of the present disclosure not all embodiments. Based on embodiments of the present disclosure, all other embodiments obtained by those of ordinary skill in the art without creative efforts shall be within the scope of the present disclosure.

Many specific details are described below to facilitate a sufficient understanding of the present disclosure. However, the present disclosure may also be implemented in other manners different from those described here. Those skilled in the art may make similar development without departing from the essence and spirit of the present disclosure. Therefore, the present disclosure is not limited by the specific embodiments disclosed below.

At present, the thickness of the backlight module formed by combining Mini LEDs and a quantum dot layer may be relatively large, which is not beneficial to develop a thin and light electronic device.

Figure 1:
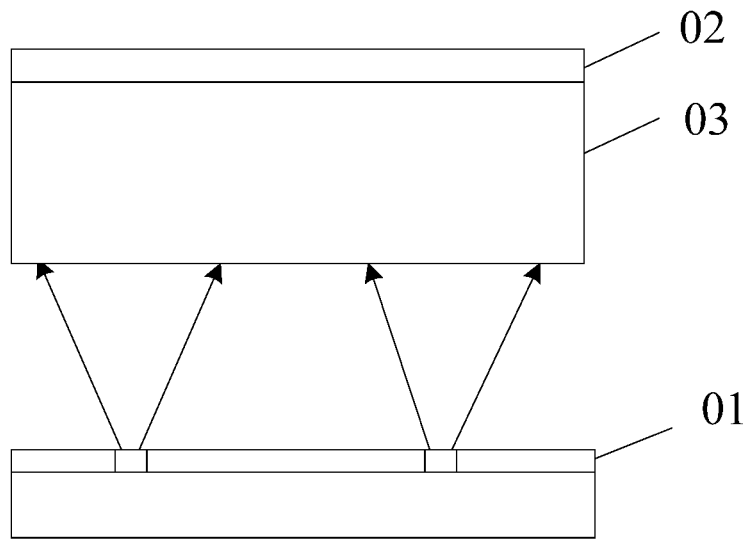
FIG. 1 illustrates a schematic structural diagram of a backlight module.
Figure 2:
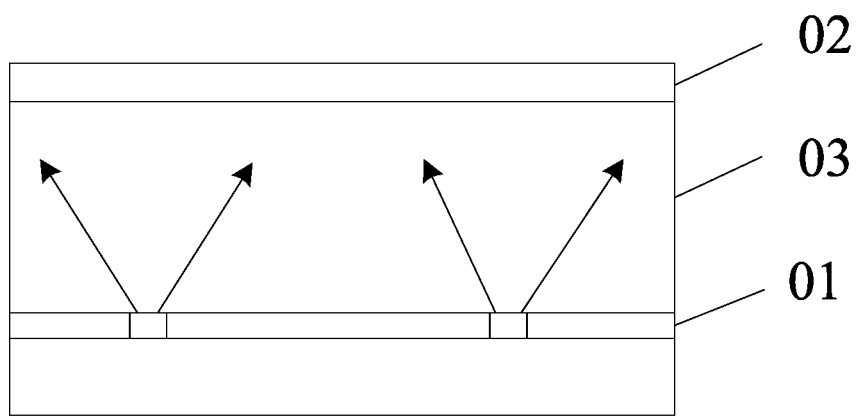
FIG. 2 illustrates a schematic structural diagram of another backlight module.

In the backlight module formed by combining the Mini LEDs and the quantum dot layer, as shown in FIG. 1, a light transmission distance between a film layer 01 where the LEDs are located and a quantum dot layer 02 is relatively large. Thus, light emitted by the LEDs may be sufficiently mixed. Then, the light may be transmitted to the quantum dot layer 02 through a light diffusion plate 03 for light conversion. Thus, uniformity of light emission of the backlight module may be improved. If the light transmission distance between the film layer 01 where the LEDs are located and the quantum dot layer 02 is reduced, as shown in FIG. 2, although the thickness of the backlight module is reduced, the light emitted by the LEDs is not sufficiently mixed. The light is directly transmitted to the quantum dot layer 02 through the light diffusion plate 03 for the light conversion, which affects the uniformity of the light emission of the backlight module.

By conducting research, inventors find that after the light transmission distance between the film layer 01 where the LEDs are located and the quantum dot layer 02 is reduced, a gap between neighboring LEDs may be reduced. Thus, the uniformity of the light emission of the backlight module may be improved by increasing the density of the LEDs. However, more LEDs may need to be added, which will significantly increase the cost of the backlight module.

Figure 3:
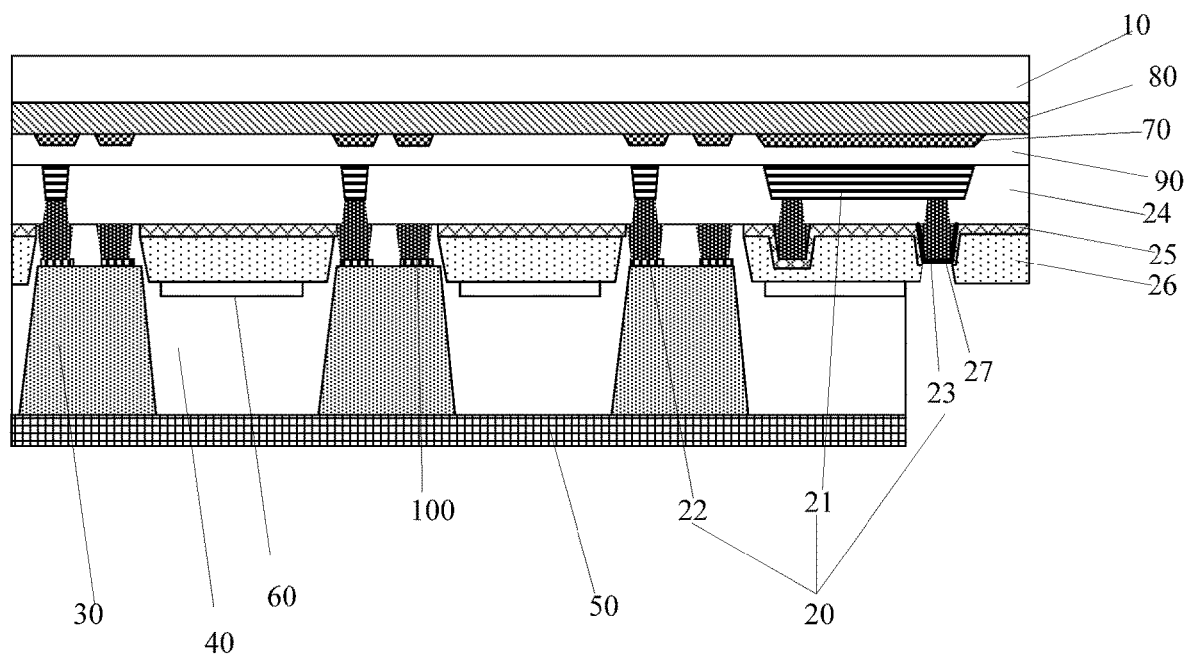
FIG. 3 illustrates a schematic structural diagram of a backlight module according to embodiments of the present disclosure.

Embodiments of the present disclosure provide a backlight module and an electronic device including the backlight module. As shown in FIG. 3, the backlight module includes a first substrate 10, a control circuit 20, a plurality of light source points, a filling layer 40, and a reflection structure 50.

In some embodiments, the first substrate 10 may be a glass substrate, which is not limited in the present disclosure.

The control circuit 20 is arranged on a first side of the first substrate 10.

The plurality of light source points is arranged on a side of the control circuit 20 away from the first substrate 10. The light source points may include at least one LED 30. The plurality of light source points may be controlled by the control circuit to emit light to a side of the light source points away from the first substrate.

The filling layer 40 may be configured to cover the plurality of light source points and the gaps between neighboring light source points.

The reflection structure 50 is arranged on the side of the filling layer 40 away from the light source points. The reflection structure 50 may be configured to reflect the light emitted by the plurality of light source points to cause a second side of the first substrate 10 to be a light-emitting side of the backlight module. The second side may be opposite to the first side.

In embodiments of the present disclosure, one light source point may correspond to one display pixel point of the electronic device.

In embodiments of the present disclosure, the light emitted by the backlight module may be white light. The light source points may include LEDs of at least one color. In some embodiments, the light source points may include LEDs of a plurality of colors. For example, the light source points may include red LEDs, blue LEDs, and green LEDs. Light of the plurality of colors may be mixed to form the white light for emission. In some other embodiments, the light source points may include LEDs of one color. For example, the light source points may include blue LEDs. In some embodiments, the backlight module may further include the quantum dot layer arranged between the control circuit and the first substrate. Thus, the white light may be formed based on the light emitted by the plurality of light source points using the quantum dot layer and transmitted out, which is not limited by the present disclosure.

In practical application, the backlight module may be applied to an application scenario of multi-color display and an application scenario of single-color display. If the light source point includes LEDs of three colors, when the backlight module is applied to the application scenario of single-color display, only single-color LEDs may be directly controlled to emit light to realize the single-color display. If the light source point includes the single-color LEDs, when the backlight module is applied to the application scenario of the single-color display, the light emitted by the light source points needs to be converted into white light by the quantum dot layer first, and the white light may be then filtered by a filter film to realize the single-color display.

The LEDs of different colors are driven independently. Thus, compared to the light source point including LEDs of one color, when the backlight module with the light source points including the LEDs of three colors is applied to the application scenario of the single-color display, the conversion from single-color light to white light and then to single color light may be saved with the backlight module. The light may have a higher color gamut.

The backlight module of embodiments of the present disclosure is described by taking an example when the light source points include the red LEDs, blue LEDs, and green LEDs, and the light of a plurality of colors is mixed into white light.

In the backlight module of embodiments of the present disclosure, the plurality of light source points may be located on a side of the control circuit away from the first substrate and emit light to the side of the light source points away from the first substrate. The light may be then reflected to the first substrate and then may be transmitted out from the side of the first substrate away from the control circuit. Thus, the length of the transmission path may be increased when the light emitted by the plurality of light source points is transmitted out through the first substrate. Thus, the light emitted by the plurality of light source points may be sufficiently mixed and then transmitted out through the first substrate to increase the uniformity of the light emitted by the backlight module.

Moreover, in the backlight module of embodiments of the present disclosure, the plurality of light source points may emit light to the side of the plurality of light source points away from the first substrate. After reaching the reflection structure, the light may be reflected by the reflection structure back to the first substrate. Then, the light is transmitted out through the first substrate. Thus, the distance between the plurality of light source points and the reflection structure and the thickness of the first substrate may be used as the transmission path. Therefore, on the basis of further reducing the thickness of the backlight module, the uniformity of the light emitted by the backlight module may be increased, which is beneficial to develop the light and thin backlight module.

In embodiments of the present disclosure, the first substrate may be used as a manufacturing substrate for the control circuit and the plurality of light source points and also used to extend the length of the transmission path from the light being emitted by the plurality of light source points to the light being transmitted out through the first substrate, which is beneficial to sufficiently mix the light emitted by the plurality of light source points to improve the uniformity of the light emitted by the backlight module. In embodiments of the present disclosure, when the light reflected by the reflection structure enters the first substrate, the light may be further mixed in the first substrate to cause the first substrate to be used as a light diffusion plate.

In embodiments of the present disclosure, the first substrate may be used as the manufacturing substrate, the light diffusion plate, and the light mixing space. Thus, the first substrate may be multi-functional.

In embodiments of the present disclosure, the reflection structure may be a foam white reflection film. In some embodiments, the reflection structure may include a plurality of microstructures configured to adjust the light transmission direction to adjust the transmission direction of the light emitted to the reflection structure by the microstructures. Thus, the light reflected back to the LED direction by the reflection structure may be relatively uniform. In embodiments of the present disclosure, a material of the microstructure may be titanium dioxide. That is, the reflection structure may include a plurality of particle structures formed by titanium dioxide. Shapes of the particle structures formed by the titanium dioxide may include a prism, a circle, or an ellipse, which is not limited by the present disclosure.

In some other embodiments of the present disclosure, the reflection structure may include a stacked indium tin oxide (ITO) layer/Ag layer/ITO layer or an enhanced specular reflector (ESR) which is not limited by the present disclosure.

Based on the above embodiments, in embodiments of the present disclosure, as shown in FIG. 3, the backlight module further includes a first light modulation layer 60.

The first light modulation layer 60 may be arranged on a side surface of the filling layer 40 away from the reflection structure 50. The first light modulation layer 60 may include a plurality of first light modulation units. The first light modulation units may be arranged in the gap between the neighboring light source points. Thus, the reflection light of the reflection structure that is emitted to the gap between the neighboring light source points may be modulated to increase the uniformity of the light emitted to the first substrate through the gap between the neighboring light source points.

In practical application, since the intensity of light close to the light source point area may be relatively large, and the intensity of light away from the light source point area may be relatively small. Therefore, in embodiments of the present disclosure, the first light modulation unit may include a first area and a second area. The first area and the second area may not overlap. A distance between the first area and the light source points may be smaller than a distance between the second area and the light source points. The light transmittance of the first area may be smaller than the light transmittance of the second area. Thus, the transmittance of the light close to the area of the light source point may be smaller than the light transmittance of the light close to the area far away from the light source point over rate.

Figure 4:
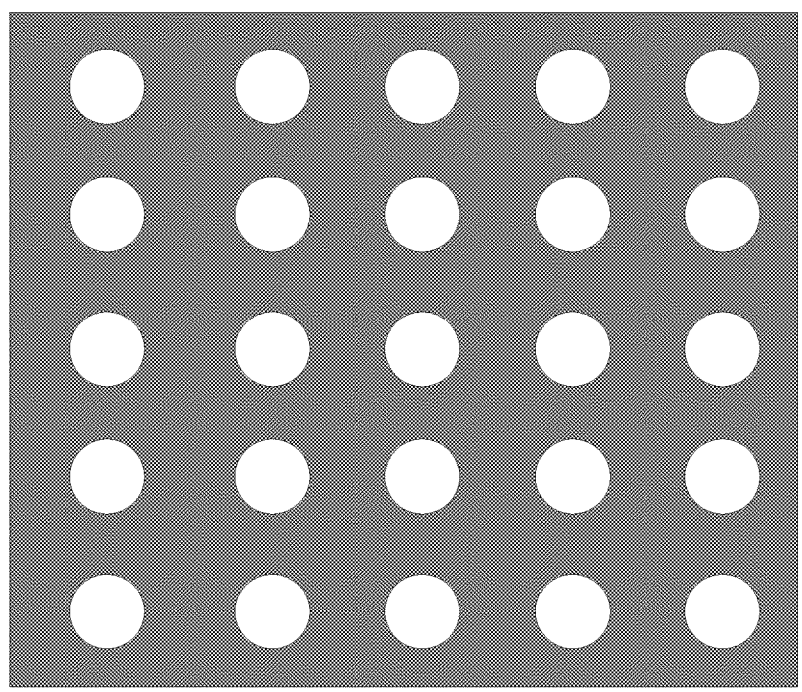
FIG. 4 illustrates a schematic partial diagram showing a light transmission area of a first light modulation unit being a through-hole in a backlight module according to embodiments of the present disclosure.
Figure 5:
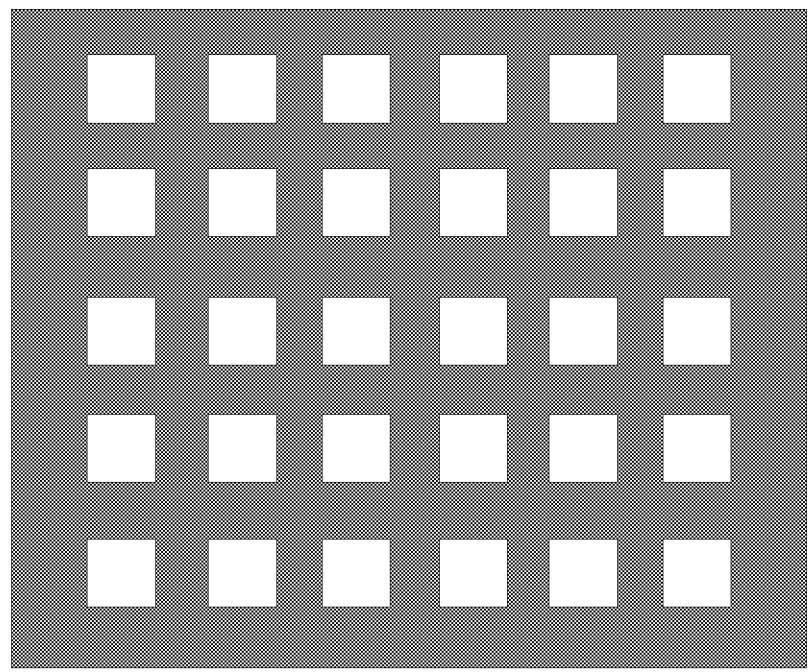
FIG. 5 illustrates a schematic partial diagram showing a light transmission area of a first light modulation unit being a through-hole in another backlight module according to embodiments of the present disclosure.

Based on the above embodiments, in embodiments of the present disclosure, the first light modulation unit may include a plurality of light-transmission holes. The density of the light-transmission holes in the first area may be smaller than the density of the light-transmission holes in the second area. Thus, the light transmittance of the first area may be smaller than the light transmittance of the second area. In some other embodiments of the present disclosure, the first light modulation unit may include a plurality of light transmission holes. A size of the light transmission hole of the first area may be smaller than a size of the light transmission hole of the second area. Thus, the light transmittance of the first area may be smaller than the light transmittance of the second area. A shape of the light-transmission hole is circular, as shown in FIG. 4, or rectangular, as shown in FIG. 5, or other shapes, which are not limited in the present disclosure. In some other embodiments of the present disclosure, the light transmittance of the first area may also be caused to be smaller than the light transmittance of the second area in other manners, which is not limited by the present disclosure.

In embodiments of the present disclosure, the size of the light-transmission hole may range from 5 micrometers to 15 micrometers, including endpoint values, which is not limited by the present disclosure.

In the above embodiment, the light-transmission holes may be arranged in the first light modulation unit to transmit light. In other embodiments of the present disclosure, an opaque unit may also be arranged in the first light modulation unit. The light may be transmitted using the gap between neighboring opaque units. A shape of the opaque unit may be circular or rectangular. For example, the light-transmission area and the opaque area may be interchanged, which is not limited by the present disclosure.

Based on any of the above embodiments, in embodiments of the present disclosure, the first light modulation unit may include a first area, a second area, and a third area. A distance between the third area and the light source point may be larger than a distance between the second area and the light source points, and than a distance between the first area and the light source points. The light transmittance of the third area may be larger than the light transmittance of the second area, and than the light transmittance of the first area.

Figure 6:
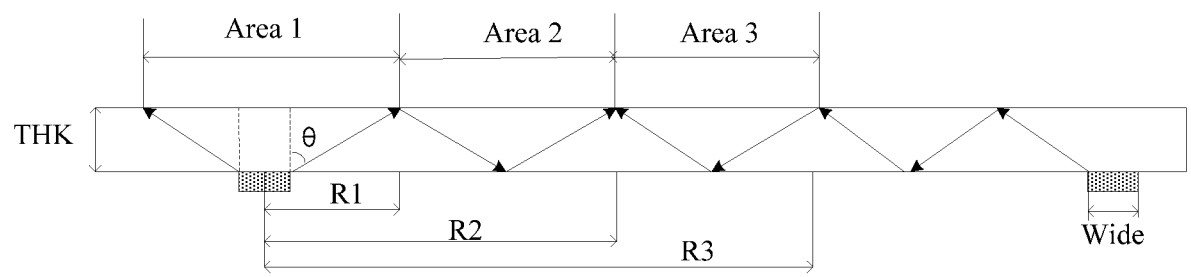
FIG. 6 illustrates a schematic partial diagram showing different light transmission areas of a first light modulation unit corresponding to a first substrate in another backlight module according to embodiments of the present disclosure.

As shown in FIG. 6, in the first light modulation unit, the light transmitted by the first area irradiates a first sub-area Area1 of the first substrate. The light transmitted by the second area irradiates the second sub-region Area2. The light transmitted by the third area irradiates a third sub-region Area3. Assume that the thickness of the first substrate (Glass) is THK. An angle between the light transmitted in the first substrate and the predetermined direction is θ. The predetermined direction is pointed to a side of the first substrate away from the light source point from a side bottom surface of the first substrate facing the light source point. A width of a plane light source formed when the light emitted by the light source point irradiates an incident surface of the first substrate may be Wide. Positions of first sub-area Area1, second sub-area Area2, and third sub-area Area3 are as follows.

Area1=2THK(Glass)*tan θ+Wide;

Area2=6THK(Glass)*tan θ+Wide−Area1=4THK(Glass)*tan θ;

Area3=10THK(Glass)*tan θ+Wide−Area2−Area1=Area2=4THK(Glass)*tan θ.

Figure 7:
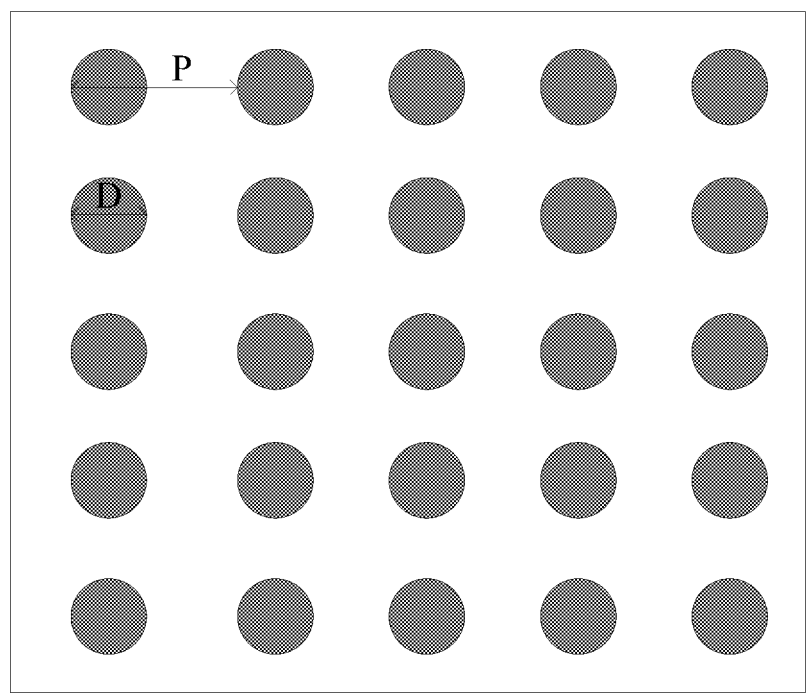
FIG. 7 illustrates a schematic partial diagram showing an opaque area of a first light modulation unit being a circular opaque unit in a backlight module according to embodiments of the present disclosure.

The opaque unit in the first light modulation unit as a circular transmission unit is taken as an example. As shown in FIG. 7, the distance between the neighboring opaque units is P, and a diameter of the opaque unit is D. In embodiments of the present disclosure, to make the light emitted from the first sub-area, the second sub-area, and the third sub-area to satisfy the requirement of 65% and the light emission efficiency to satisfy the requirement of 55%, the light transmittance of the first area may be 20% and the light reflectivity may be 80%. The light transmittance of the second area may be 28.2%, and the light reflectivity may be 72.8%. The light transmittance of the second area may be 80%, and the light reflectivity may be 20%. Correspondingly, the distance between the opaque units of the first area may be 10 micrometers, and the diameter of the opaque units may be 8 micrometers. An area of opaque units may take 80% area of the first area. A distance between the opaque units of the second area may be 10 micrometers. The diameter of the opaque unit may be 9.4 micrometers. An area of the opaque unit may take 94% of the area of the second area. A distance between opaque units of the third area may be 10 micrometers, and the diameter of the opaque unit may be 2 micrometers. An area of the opaque unit may take 20% of the area of the third area. In some embodiments, the distance between the opaque units and the diameters of the opaque units may be strict design values. The process may be difficult. Therefore, based on the above embodiments, in some embodiments, the tolerances of the distance between the opaque units and the diameter of the opaque unit may float within 10%. In some embodiments, the tolerances of the distance between the opaque units and the diameter of the opaque unit may float within 5%, which is not limited in the present disclosure.

Based on any of the above embodiments, in embodiments of the present disclosure, the first light modulation layer may be a metal layer to improve a shading effect of the opaque area of the first light modulation layer. In embodiments of the present disclosure, the distance between the first light modulation unit and the predetermined area of the light source point closest to the first light modulation unit may be not less than 10 micrometers. The predetermined area of the light source point may be an area where the LED of the light source point is electrically connected to the control circuit. Thus, the short circuit between the first light modulation unit and the LED may be avoided to affect the light emission of the LED.

Based on the above embodiments, in embodiments of the present disclosure, the first light modulation layer may include a first ITO layer, a silver layer, and a second ITO layer that are stacked together. Thus, the first light modulation layer may have higher light reflectivity. The first light modulation layer may be configured to reflect the light transmitted to the opaque area of the first light modulation unit back to the reflection structure. Thus, the first light modulation layer may perform modulation on the light transmitted to the gap between the neighboring light source points and reduce light absorbed by the first light modulation layer to improve the light emission efficiency of the backlight module. In other embodiments of the present disclosure, the first light modulation layer may also include a film layer with a higher emissivity, such as a white glue layer, which is not limited by the present disclosure.

In some embodiments, the light reflected to the reflection structure by the first light modulation layer may be continuously reflected between the first light modulation layer and the reflection structure until the light is transmitted to the first substrate through the light-emitting area of the first light modulation layer. Therefore, in embodiments of the present disclosure, when the first light modulation layer may include the first ITO layer, the silver layer, and the second ITO layer that are stacked and have a higher reflectivity, the adsorption of the light transmitted to the opaque area of the first light modulation layer may be reduced, and the light emission efficiency of the backlight module may be improved.

If the light source points include LEDs of a plurality of colors, under the same drive current, the light-emitting efficiency of the green LED may be greater than the light-emitting efficiency of the red LED and greater than the light-emitting efficiency of the blue LED. Therefore, based on any of the above embodiments, in embodiments of the present disclosure, the plurality of light source points may include a red light-emitting area, a green light-emitting area, and a blue light-emitting area that are periodically arranged. Correspondingly, the first light modulation layer may include a red light transmission area that transmits red light, a green light transmission area that transmits green light, and a blue light transmission area that transmits blue light. A ratio of transmission fluxes of the red light transmission area, the green light transmission area, and the blue light transmission area may be 3:6:1. Thus, the light emitted from the backlight module may be the white light without being greenish and/or reddish.

In some embodiments, based on the above embodiments, in embodiments of the present disclosure, the red LED, green LED, and blue LED may be arranged in an equilateral triangle in a same light source point to improve the uniformity of the light emission of the backlight module. Meanwhile, the purity of the white light emitted by the backlight module may be improved to reduce color shift.

After the light emitted by the plurality of light source points is transmitted to the reflection structure and then reflected by the reflection structure, the light may be transmitted to the gap between the neighboring light source points. The first light modulation unit may be arranged in the gap between the neighboring light source points. The first light modulation unit may include the light-transmission area and the opaque area. The light transmitted to the opaque area of the first light modulation unit may be reflected back to the reflection structure again so as to be reflected back and forth between the reflection structure and the first light modulation layer, until the light is transmitted to the first substrate through the light transmission area of the first light modulation unit.

Figure 8:
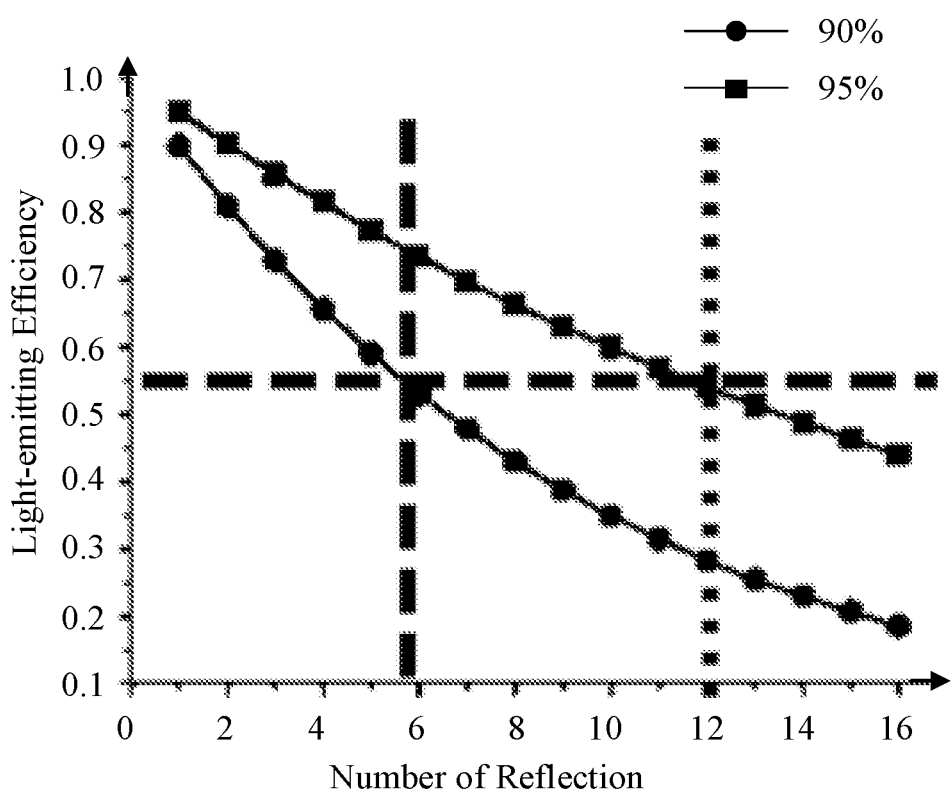
FIG. 8 illustrates a schematic curve diagram showing a reflection number and light efficiency of a backlight module when reflectivity of a reflection structure is 90% and 95% in the backlight module according to embodiments of the present disclosure.

In the process of reflecting the light back and forth between the first light modulation layer and the reflection structure, the intensity of the light may be attenuated. FIG. 8 illustrates a schematic curve diagram showing a reflection number and light-emitting efficiency of a backlight module when reflectivity of a reflection structure is 90% and 95% in the backlight module according to embodiments of the present disclosure. As shown in FIG. 8, when the number of reflections is larger, the light-emitting efficiency of the backlight module is lower. When the number of reflections is greater than 6, the light-emitting efficiency of the backlight module may decrease quickly. Therefore, based on any of the above embodiments, in embodiments of the present disclosure, in order to ensure the light-emitting efficiency of the backlight module, the number of the reflections of the light reflected by the reflection structure may not exceed 6 between the reflection structure and the first light modulation layer. Further, the number of reflections may not exceed 3 times. Thus, a large number of the reflections of the light between the reflection structure and the first light modulation layer may be avoided to have a severe attenuation of the light intensity and affect the light-emitting efficiency of the backlight module.

Figure 9:
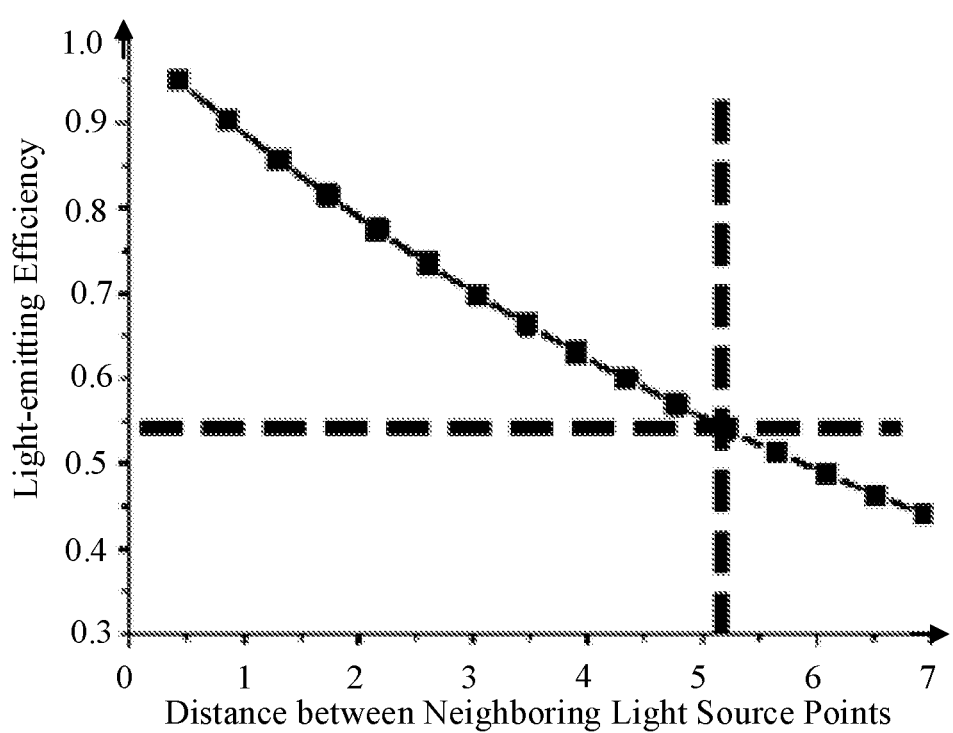
FIG. 9 illustrates a schematic curve diagram showing a gap size between neighboring light source points and light-emitting efficiency of a backlight module when reflectivity of a reflection structure is 95% in the backlight module according to embodiments of the present disclosure.
Figure 10:
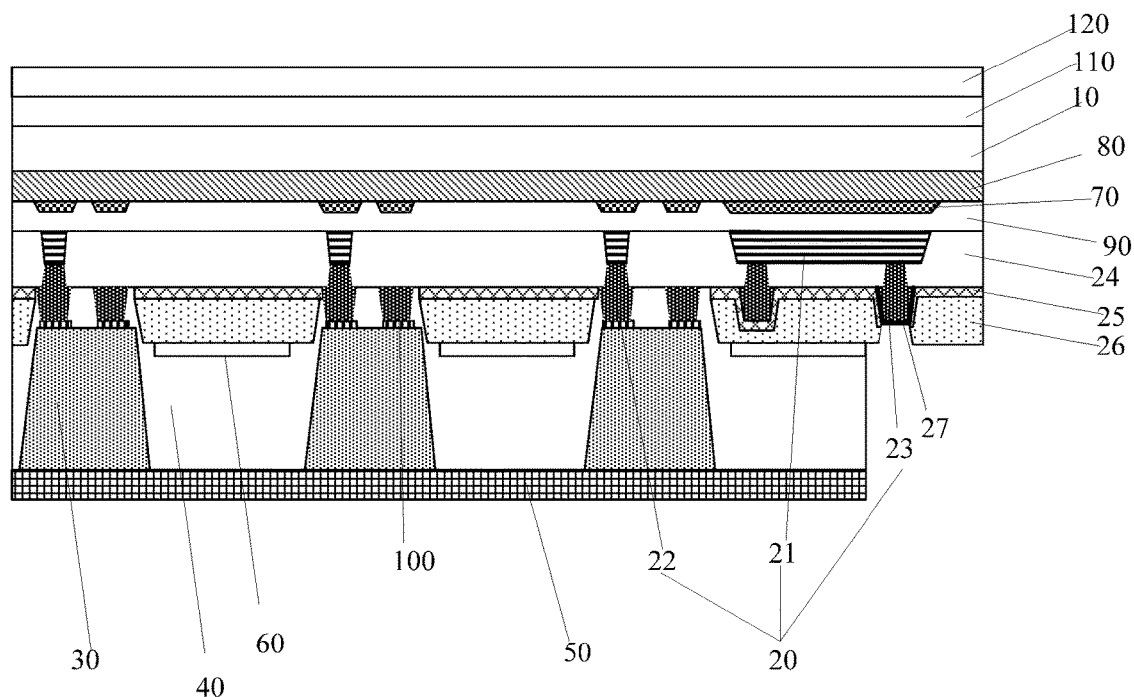
FIG. 10 illustrates a schematic structural diagram of another backlight module according to embodiments of the present disclosure.

FIG. 9 illustrates a schematic curve diagram showing a gap size between neighboring light source points and the light-emitting efficiency of the backlight module when the reflectivity of the reflection structure is 95% in the backlight module according to embodiments of the present disclosure. As shown in FIG. 9, when the gap size between the neighboring light source points is larger, the light-emitting efficiency of the backlight module is lower. When the size of the gap between the neighboring light source points is 5 mm, the light-emitting efficiency of the backlight module may decrease quickly. Therefore, in embodiments of the present disclosure, the size of the gap between the LEDs of a same color may range from 3 mm to 5 mm. In some embodiments, the size of the gap may range from 4.25 mm to 4.75 mm including endpoint values. Further, the size of the gap may be 4.5 mm, which is not limited in the present disclosure.

In some embodiments, the size of the gap between the neighboring LEDs in the same light source point may be 100 micrometers. The thickness of the layers (including the control circuit, the reflection structure, and the layers between the control circuit and the reflection structure) in the backlight module that are arranged on a side of the first substrate facing the reflection structure may be 3 mm. The thickness of the first substrate may be 7 mm, which is not limited in the present disclosure.

Based on any of the above embodiments, in embodiments of the present disclosure, the backlight module may further include a back film 110 arranged on a second side of the first substrate 10. Thus, the back film 110 may be configured to perform modulation on the light emitted from the side of the first substrate 10 away from the plurality of light source points to cause the light emitted from the backlight module to be vertically transmitted from the backlight module.

Based on the above embodiments, in embodiments of the present disclosure, the backlight module may further include a light diffusion film 120 arranged on a side of the back film 110 away from the first substrate 10. Thus, the light diffusion film 120 may be configured to perform modulation on the light emitted from the back film 110 to improve the light-emitting efficiency of the backlight module. Based on experiments, when the backlight module includes the back film but does not include the light diffusion film, the light-emitting efficiency may be 70%. When the backlight module includes the back film and the light diffusion film, the light-emitting efficiency may reach 90%, which is not limited by the present disclosure. In embodiments of the present disclosure, the first substrate may also be used as a carrier substrate for an optical functional layer such as the back film and the light diffusion film. Thus, the first substrate may be further reused to simplify the structure of the backlight module.

According to above, the control circuit may be arranged between the first substrate and the plurality of light source points. The control circuit may have a multi-layer metal structure, which is used as circuit wiring and a circuit structure of the control circuit. Therefore, when the light transmitted through the gap between the neighboring LEDs passes through the control circuit, the light may be reflected by the metal structure in the control circuit. Thus, the light may be reflected back and forth between the first light modulation layer and the control circuit, which affects the uniformity of the light-emitting of the backlight module.

Therefore, based on any of the above embodiments, in embodiments of the present disclosure, as shown in FIG. 3, the backlight module further includes a second light modulation layer 70 arranged between the first substrate 10 and the control circuit 20. Thus, the second light modulation layer 70 may be configured to perform modulation on the light that passes through the control circuit and is transmitted to the first substrate 10 to improve the uniformity of the light emitted from the first substrate 10.

In embodiments of the present disclosure, the second light modulation layer may be a single metal layer such as an Ag layer and an Al layer or a composite metal layer such as an ITO/Ag/ITO layer or an AlNd layer, which is not limited in the present disclosure.

Based on the above embodiments, in embodiments of the present disclosure, the second light modulation layer may include a plurality of second light modulation units. The second light modulation units may match the light transmission areas of the first light modulation units. Thus, the second light modulation layer may be configured to perform the modulation on the light that passes through the control circuit and is transmitted to the first substrate, and the second light modulation layer may be prevented from negatively affecting the uniformity of the light that is regulated by the first light modulation layer. The present disclosure does not limit this.

Based on the above embodiment, in embodiments of the present disclosure, the line width of the first light modulation layer matches the line width of the second light modulation layer. Thus, the second light modulation layer may be further prevented from negatively affecting the uniformity of the light that is regulated by the first light modulating layer. In embodiments of the present disclosure, the line width of the first light modulation layer may be equal to the line width of the second light modulation layer to further prevent the second light modulation layer from negatively affecting the uniformity of the light that is regulated by the first light modulation layer. However, the present disclosure does not limit this.

Based on any of the above embodiments, in embodiments of the present disclosure, as shown in FIG. 3, the control circuit 20 includes a control wiring 21 and a connection weld plate 22 electrically connected to the control wiring 21 and the LEDs. The control wiring may be usually a copper wiring, and the copper wiring may absorb a large amount of light. In embodiments of the present disclosure, the control wiring may include the copper wiring and a silver wiring wrapped around the copper wiring. Thus, the copper wiring may be used to reduce the resistance of the control wiring. The silver wiring may be used to reduce the light absorption of the control wiring. The connection weld plate may include a copper weld plate. Thus, the resistance between the control wiring and the LEDs may be reduced to increase a current transmission speed between the control wiring and the LEDs.

Based on the above embodiments, in embodiments of the present disclosure, a wiring density of the control wiring close to the light source point area may be greater than a wiring density of the control wiring far away from the light source point area. Since the control wiring is the metal wiring, and the metal wiring is opaque, the wiring density of the control wiring close to the light source point area may be greater than a wiring density of the control wiring far away from the light source point area. The light that passes the gap of the neighboring LEDs and is transmitted to the first substrate may be modulated using an arrangement density of the control wiring. Thus, the uniformity of the light emitted from the first substrate may be adjusted.

Based on any of the above embodiments, in embodiments of the present disclosure, the line width of the first light modulation layer may be the same as the line width of the control wiring and/or the line width of the second light modulation layer may be the same as the line width of the control wiring. Components of the first light modulation layer may be arranged directly below the control wiring and be in a spiral shape. Components of the second light modulation layer may be directly below the control wiring and be in a spiral shape to reduce the light amount that is transmitted to the control wiring. The light amount absorbed by the control wiring may be reduced, and the light-emitting efficiency of the backlight module may be increased.

Based on any of the above embodiments, in embodiments of the present disclosure, as shown in FIG. 3, the control circuit further includes a lead terminal 23 arranged in a binding area. When the lead terminal is a copper terminal, the control circuit may further include a transparent protection layer 27 covering the lead terminal. The transparent protection layer may include an ITO layer. The ITO layer may be used to protect the copper terminal. Thus, before other structures are bonded in the binding area, the copper terminal may be prevented from being directly exposed in the air and corroded.

Figure 11:
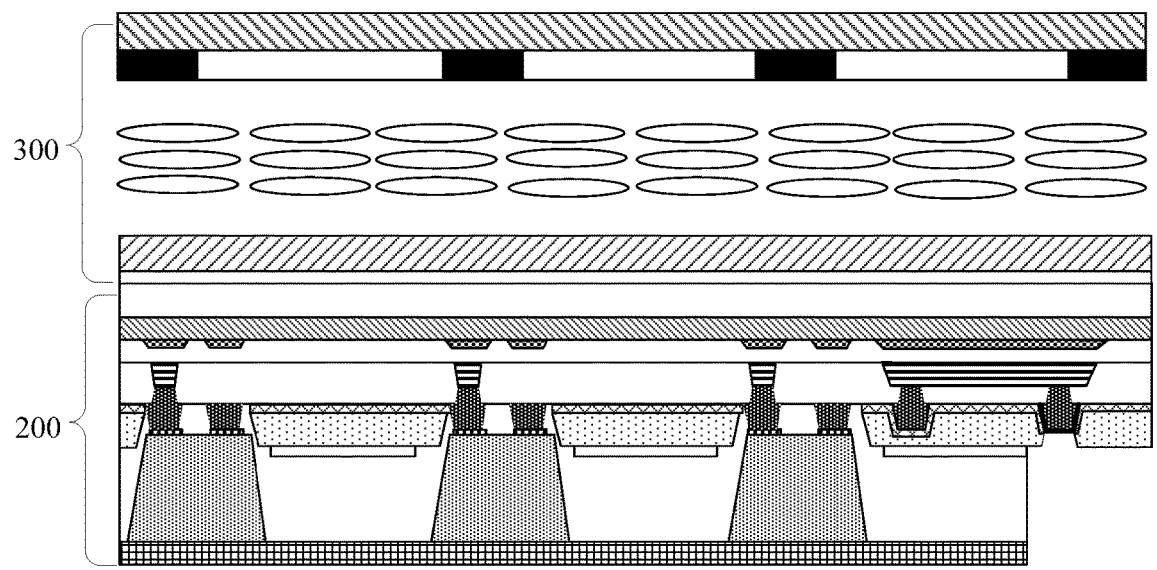
FIG. 11 illustrates a schematic structural diagram of an electronic device according to embodiments of the present disclosure.

As shown in FIG. 11, the electronic device of embodiments of the present disclosure includes a backlight module 200 and a display module 300. The display module 300 may be arranged on a light-emitting side of the backlight module 200. The display module 300 may display based on the light emitted by the backlight module. In some embodiments, the display module may be a liquid crystal display module and include an array substrate, a color film substrate, and a liquid crystal layer arranged between the array substrate and the color film substrate. The array substrate may be arranged between the liquid crystal layer and the backlight module.

The light emitted by the backlight module of embodiments of the present disclosure may be relatively uniform, and the thickness of the backlight module may be relatively small. Therefore, in the electronic device of embodiments of the present disclosure, when the display module performs displaying based on the light emitted by the backlight module, the display picture quality of the display module may be good. The thickness of the electronic device may be relatively small, which may be used to develop a light and thin electronic device.

In embodiments of the present disclosure, an overall thickness of the backlight module may be only 1.6 mm, which is not limited in the present disclosure.

Correspondingly, embodiments of the present disclosure may also provide a manufacturing method for the backlight module. As shown in FIG. 3, the manufacturing method includes the following processes.

At S1, the control circuit 20 is formed on the first side of the first substrate 10. In some embodiments, the first substrate 10 may be a glass substrate.

In embodiments of the present disclosure, before forming the control circuit on the first side of the first substrate, the method further includes the following processes.

A reverse stress layer (also known as a buffer layer) 80 may be formed on the first side surface of the first substrate 10. The control circuit 20 may be formed on the side surface of the reverse stress layer 80 away from the first substrate 10 to adjust the stress of the first substrate to ensure flatness of a surface where the control circuit 20 is formed, which is not limited in the present disclosure.

In embodiments of the present disclosure, forming the control circuit on the first side of the first substrate includes the following processes.

A first metal layer may be formed on the first side of the first substrate 10. In some embodiments, the first metal layer may be a copper layer. A formation process may be a sputtering process or an electroplating process. The thickness may range from 2 to 10 micrometers including endpoint values.

The first metal layer may be etched to form a plurality of first metal wirings. The first metal wiring may be the control wiring 21 of the LED, which is configured to lead out a P electrode and an N electrode of the LED.

A first dielectric layer 24 may be formed on a side of the first metal layer away from the first substrate 10. The first dielectric layer 24 may be an insulation layer. In embodiments of the present disclosure, the first dielectric layer 24 may be a $SiN_x$ layer with a thickness of 100 nm. The first dielectric layer 24 may be formed in a resin filling process and a high-temperature curing process. In some other embodiments of the present disclosure, the first dielectric layer may be an organic material layer, which is formed by directly filling the organic material at a low temperature. The thickness may range from 2 micrometers to 5 micrometers, including the endpoint values, which are not limited by the present disclosure. Compared to forming the first dielectric layer in the high-temperature curing process, forming the first dielectric layer by directly filling the organic material at a low temperature may prevent the first metal wiring from being oxidized.

A second metal layer may be formed on a side of the first dielectric layer 24 (the first dielectric layer is a first planarization layer) away from the first metal layer. The second metal layer may be a copper layer, and the thickness of the second metal layer may range from 0.5 μm to 1 μm, including the endpoint values.

The second metal layer may be etched to form a plurality of connection weld plates 22 in a non-bonding area and the lead terminal 23 in the bonding area. The connection weld plates 22 may be electrically connected to a part of the first metal wirings. The lead terminal 23 may be also electrically connected to a part of the first metal wiring.

A transparent protection layer 27 may be formed on a side surface of the lead terminal 23 away from the first dielectric layer 24. The transparent protection layer may be an ITO layer. The transparent protection layer may be configured to protect the lead terminal and prevent the lead terminal from being oxidized in a subsequent process such as printing, packaging, etc. In some embodiments, the thickness of the transparent protection layer may range from 500 A to 1500 A, including the endpoint values.

A second dielectric layer 26 may be formed on a side of the second metal layer away from the first dielectric layer 24. The second dielectric layer 26 may be a planarization layer covering the connection weld plates and at least a part of the transparent protection layer. In some embodiments, the material of the second dielectric layer may be an organic material, such as a polyimide system and an acrylic system. The process of forming the second dielectric layer may be an organic material low-temperature process. For example, a process temperature may be less than 150° C. to prevent the second metal layer from being oxidized.

A third metal layer may be formed on a side of the second dielectric layer 26 away from the second metal layer.

The third metal layer may be etched to form an electrical connection terminal 100 that is electrically connected to the connection weld plate 22, The electrical connection terminal 100 may be electrically connected to a positive/negative electrode of the subsequent LED.

When the formation process of the second dielectric layer is the high-temperature process, before forming the second dielectric layer, the method may further include, forming a second protection layer 25 on the side of the second metal layer away from the first dielectric layer 24. The second dielectric layer 26 may be formed on a side surface of the second protection layer away from the first substrate 10. After the second dielectric layer 26 is formed, the second dielectric layer 26 and the second protection layer 25 may be etched to expose the connection weld plates 22 and the lead terminal 23 to prevent the second metal layer from being oxidized when the second dielectric layer 26 is formed at a high temperature.

Based on the above embodiment, in embodiments of the present disclosure, the density of the plurality of first metal wirings in the area close to the light source points may be greater than the density of the plurality of first metal wirings in the area away from the light source points. Thus, the plurality of first metal wirings may be used as a light control layer to adjust the uniformity of light-emitting of the backlight module.

In embodiments of the present disclosure, the density of a part of the plurality of first metal wirings close to the light source point area may be relatively large. Thus, 70%-80% of the light transmitted to the light source point area may be returned. The density of a part of the plurality of first metal wirings away from the light source point area may be relatively small to return 50% of the light transmitted to the area.

At S2, a plurality of light source points is fixed on the side of the control circuit away from the first substrate. The light source points include at least one LED 30. The plurality of light source points are controlled by the control circuit to emit light to the side of the light source points away from the first substrate.

In embodiments of the present disclosure, the process of fixing the plurality of light source points at the control circuit away from the first substrate may be a bonding process, which is not limited by the present disclosure.

Since the control circuit is arranged between the first substrate and the plurality of light source points, and the control circuit includes a multi-layer metal structure as the structure of the circuit wiring and circuit in the control circuit. Thus, when the light transmitted through the gaps between the neighboring LEDs passes through the control circuit, the light may be reflected by the metal structure of the control circuit, which affects the uniformity of light-emitting of the backlight module. The circuit wiring may include the control wiring. The circuit structure may include a plurality of thin film transistors configured to control operation states of the LEDs. The thin film transistors may be in an one-to-one correspondence with the LEDs. Thus, under the control of the same power supply, the LEDs may be controlled independently.

Therefore, in some embodiments of the present disclosure, before forming the control circuit on the side of the reverse stress layer away from the first substrate, the method may further include the following processes.

The second light modulation layer 70 may be formed on a side surface of the reverse stress layer 80 away from the first substrate 10. Thus, the second light modulation layer 70 may be configured to perform modulation on the light transmitted to the first substrate passing through the control circuit 20 to improve the uniformity of the light emitted from the first substrate 10.

The first protection layer 90 may be formed on the side of the second light modulation layer 70 away from the reverse stress layer 80. The first protection layer 90 may be an insulation layer. The control circuit 20 may be formed on the side surface of the first protection layer 90 away from the second light modulation layer 70 to avoid a short circuit between the second light modulation layer 70 and the control circuit 20.

Based on the above embodiment, in embodiments of the present disclosure, the first protection layer may be an inorganic layer, such as a SiNx layer or a SiO2 layer, or an organic polymer layer. The thickness of the first protection layer may range from 1000 A to 3000 A, including the endpoint values, which are not limited by the present disclosure.

At S3, the filling layer 40 is formed on the side of the light source points away from the control circuit to cover the plurality of light source points and the gaps between the neighboring light source points. The filling layer is a packaging layer.

In embodiments of the present disclosure, the method may further include the following processes.

Before forming the filling layer 40, the first light modulation layer 60 may be formed between the neighboring light source points. The first light modulation layer 60 may include a plurality of first light modulation units. The filling layer 40 may be formed on the side of the first light modulation units away from the first substrate.

The control circuit 20 may include the control wiring 21 and the connection weld plates 22 that are electrically connected to the control wiring 21 and the LEDs. The line width of the first light modulation unit may match the line width of the control wiring.

In embodiments of the present disclosure, The first light modulation layer may be arranged on the side surface of the second dielectric layer away from the first substrate. The thickness of the first light modulation layer may be smaller than the thickness of the LEDs. Thus, in some embodiments of the present disclosure, the first light modulation unit may be formed first, and then the LEDs may be fixed to reduce the difficulty of the manufacturing process of the first light modulation units.

At S4, the reflection structure 50 is formed on the side of the filling layer 40 away from the light source points. The reflection structure 50 is configured to reflect the light emitted by the plurality of light source points to cause the second side of the first substrate 10 to be the light-emitting side of the backlight module. The second side is opposite to the first side.

In embodiments of the present disclosure, the reflection structure may include a stacked ITO layer/Ag layer/ITO layer. In some other embodiments of the present disclosure, the reflection structure may be an enhanced specular reflector (ESR). The ESR may be formed by bonding 3M multi-layer organic film material with the reflectivity as high as 98%. In still some other embodiments of the present disclosure, the reflection structure may also be a foamed white reflection film, i.e., a reflection film with a microstructure, which is not limited in the present disclosure.

In summary, in the backlight module and the electronic device including the backlight module of embodiments of the present disclosure, the plurality of light source points may be arranged on the side of the control circuit away from the first substrate and configured to emit light to the side of the light source points away from the first substrate. The light may be reflected by the reflection structure back to the first substrate. Then, the light may be transmitted out from the side of the first substrate away from the control circuit. Thus, the transmission length of the light from being emitted by the plurality of light source points to being transmitted out by the first substrate. Therefore, the light emitted by the plurality of light source points may be sufficiently mixed and then emitted through the first substrate to improve the uniformity of the light emitted by the backlight module.

In addition, in the backlight module and the electronic device including the backlight module of embodiments of the present disclosure, the plurality of light source points may be configured to emit light to the side of the plurality of light source points away from the first substrate. After the light is transmitted to the reflection structure, the light may be reflected by the reflection structure back to the first substrate and then transmitted out from the first substrate. Thus, the distance between the plurality of light source points and the reflection structure and the thickness of the first substrate may be sufficiently used as the transmission path to reduce the thickness of the backlight module, improve the uniformity of the light emitted by the backlight module, and be beneficial to develop a light and thin backlight module.

In addition, the manufacturing method of the backlight module of embodiments of the present disclosure may be compatible with the existing manufacturing method of the backlight module to reduce the manufacturing cost of the backlight module.

The parts of the specification are described in a combination manner of parallel and progression. Each part focuses on the differences from other parts. Same and similar parts may be referred to each other.

For the above description of embodiments of the present disclosure, the features described in embodiments of the present disclosure may be replaced or combined with each other. Thus, those skilled in the art may realize or use the present disclosure. Various modifications to these embodiments may be apparent to those skilled in the art. The generic principles defined herein may be implemented in other embodiments without departing from the spirit or scope of the present disclosure. Therefore, the present disclosure is not intended to be limited to embodiments of the present disclosure but conforms to the widest scope consistent with the principles and novel features of the present disclosure.

What is claimed is:

1. A backlight module comprising:
a first substrate;
a control circuit arranged on a first side of the first substrate;
a plurality of light source points arranged on a side of the control circuit away from the first substrate, including at least one type of LED, and being controlled by the control circuit to emit light to a side of the LED away from the first substrate;
a filling layer covering the plurality of light source points and a gap between neighboring light source points; and
a reflection structure arranged on a side of the filling layer away from the plurality of light source points and configured to reflect the light emitted by the plurality of light source points to cause a second side of the first substrate to be a light-emitting side of the backlight module, the second side being opposite to the first side,
wherein:
the control circuit includes a control wiring and a connection weld plate electrically connected to the control wiring and the LED;
the control wiring includes a copper wiring and a silver wiring wrapped on a surface of the copper wiring; and
the connection weld plate includes a copper weld plate.

2. The backlight module according to claim 1, wherein:
a wiring density of the control wiring close to a light source point area is greater than a wiring density of the control wiring away from the light source point area;
when the backlight module further includes a first light modulation layer and a second light modulation layer, a line width of a first light modulation unit matches a line width of the control wiring, and a line width of a second light modulation unit matches the line width of the control wiring.

3. An electronic device comprising:
the backlight module according to claim 1; and
a display module arranged on the light-emitting side of the backlight module and displaying based on the light emitted by the backlight module.

4. The electronic device according to claim 3, wherein:
a wiring density of the control wiring close to a light source point area is greater than a wiring density of the control wiring away from the light source point area;
when the backlight module further includes a first light modulation layer and a second light modulation layer, a line width of a first light modulation unit matches a line width of the control wiring, and a line width of a second light modulation unit matches the line width of the control wiring.

5. The backlight module of claim 1, further comprising:
a first light modulation layer formed on a side surface of the filling layer away from the reflection structure and including a plurality of first light modulation units, a first light modulation unit being arranged in the gap between the neighboring light source points,
wherein:
the first light modulation unit includes a first area and a second area, the first area and the second area do not overlap, and a distance between the first area and the light source points is smaller than a distance between the second area and the light source points; and
light transmittance of the first area is smaller than light transmittance of the second area.

6. A backlight module according to claim 1, further comprising:
a first substrate;
a control circuit arranged on a first side of the first substrate;
a plurality of light source points arranged on a side of the control circuit away from the first substrate, including at least one type of LED, and being controlled by the control circuit to emit light to a side of the LED away from the first substrate;
a filling layer covering the plurality of light source points and a gap between neighboring light source points;
a reflection structure arranged on a side of the filling layer away from the plurality of light source points and configured to reflect the light emitted by the plurality of light source points to cause a second side of the first substrate to be a light-emitting side of the backlight module, the second side being opposite to the first side; and
a first light modulation layer formed on a side surface of the filling layer away from the reflection structure and including a plurality of first light modulation units, a first light modulation unit being arranged in the gap between the neighboring light source points;
wherein:
the first light modulation unit includes a first area and a second area, the first area and the second area do not overlap, and a distance between the first area and the light source points is smaller than a distance between the second area and the light source points; and
light transmittance of the first area is smaller than light transmittance of the second area.

7. The backlight module according to claim 6, wherein the first light modulation layer includes a first ITO layer, a silver layer, and a second ITO layer that are stacked.

8. The backlight module according to claim 6, wherein:
the plurality of light source points include a red light-emitting area, a green light-emitting area, and a blue light-emitting area arranged periodically; and
the first light modulation unit includes a red light transmission area that transmits red light, a green light transmission area that transmits green light, and a blue light transmission area that transmits blue light, a ratio of light fluxes of the red light transmission area, the green light transmission area, and the blue light transmission area being 3:6:1.

9. The backlight module of claim 6, wherein the light reflected by the reflection structure is reflected no more than three times between the reflection structure and the first light modulation layer.

10. The backlight module of claim 6, further comprising:
a back film formed on the second side of the first substrate;
a light diffusion film formed on a side of the back film away from the first substrate; and
a second light modulation layer formed between the first substrate and the control circuit and including a plurality of second light modulation units, light transmission areas of the second light modulation units matching transmission areas of the first light modulation units.

11. An electronic device comprising
the backlight module according to claim 6; and
a display module arranged on the light-emitting side of the backlight module and displaying based on the light emitted by the backlight module.

12. The electronic device according to claim 11, wherein the first light modulation layer includes a first ITO layer, a silver layer, and a second ITO layer that are stacked.

13. The electronic device according to claim 11, wherein:
the plurality of light source points include a red light-emitting area, a green light-emitting area, and a blue light-emitting area arranged periodically; and
the first light modulation unit includes a red light transmission area that transmits red light, a green light transmission area that transmits green light, and a blue light transmission area that transmits blue light, a ratio of light fluxes of the red light transmission area, the green light transmission area, and the blue light transmission area being 3:6:1.

14. The electronic device of claim 11, wherein the light reflected by the reflection structure is reflected no more than three times between the reflection structure and the first light modulation layer.

15. The electronic device of claim 11, wherein the backlight module further includes:
a back film formed on the second side of the first substrate;
a light diffusion film formed on a side of the back film away from the first substrate; and
a second light modulation layer formed between the first substrate and the control circuit and including a plurality of second light modulation units, light transmission areas of the second light modulation units matching transmission areas of the first light modulation units.

16. A manufacturing method for a backlight module comprising:
forming a control circuit on a first side of a first substrate;
fixing a plurality of light source points on a side of the control circuit away from the first substrate, the plurality of light source points including at least one type of LED, and the plurality of light source points being controlled by the control circuit to emit light to a side of the plurality of light source points away from the first substrate;
forming a first light modulation unit between neighboring light source points of the plurality of light source points;
forming a filling layer on a side of the plurality of light source points away from the control circuit covering the plurality of light source points and a gap between neighboring light source points, the filling layer being formed on a side of the first light modulation unit away from the first substrate; and forming a reflection structure on a side of the filling layer away from the plurality of light source points, the reflection structure being configured to reflect the light emitted by the plurality of light source points to cause a second side of the first substrate to be a light-emitting side of the backlight module, the second side being opposite to the first side;

wherein:

the control circuit includes a control wiring and a connection weld plate electrically connected to the control circuit and the LED; and a line width of the first light modulation unit matches a line width of the control wiring.

17. The method according to claim 16, wherein the first light modulation unit includes a first ITO layer, a silver layer, and a second ITO layer that are stacked.

18. The method according to claim 16, wherein:

the plurality of light source points include a red light-emitting area, a green light-emitting area, and a blue light-emitting area arranged periodically; and the first light modulation unit includes a red light transmission area that transmits red light, a green light transmission area that transmits green light, and a blue light transmission area that transmits blue light, a ratio of light fluxes of the red light transmission area, the green light transmission area, and the blue light transmission area being 3:6:1.

19. The method of claim 16, wherein the first light modulation unit is formed such that light reflected by the reflection structure is reflected no more than three times between the reflection structure and the first light modulation unit.

20. The method of claim 16, further comprising:

forming a back film on the second side of the first substrate;

forming a light diffusion film on a side of the back film away from the first substrate; and forming a second light modulation layer between the first substrate and the control circuit and including a second light modulation unit, a light transmission area of the second light modulation unit matching a transmission area of the first light modulation unit.

* * * * *